(No Model.)　　　　　　　　　　　　　　　　4 Sheets—Sheet 1.
J. C. NYE.
SEED PLANTER.
No. 361,074.　　　　　　　　　Patented Apr. 12, 1887.
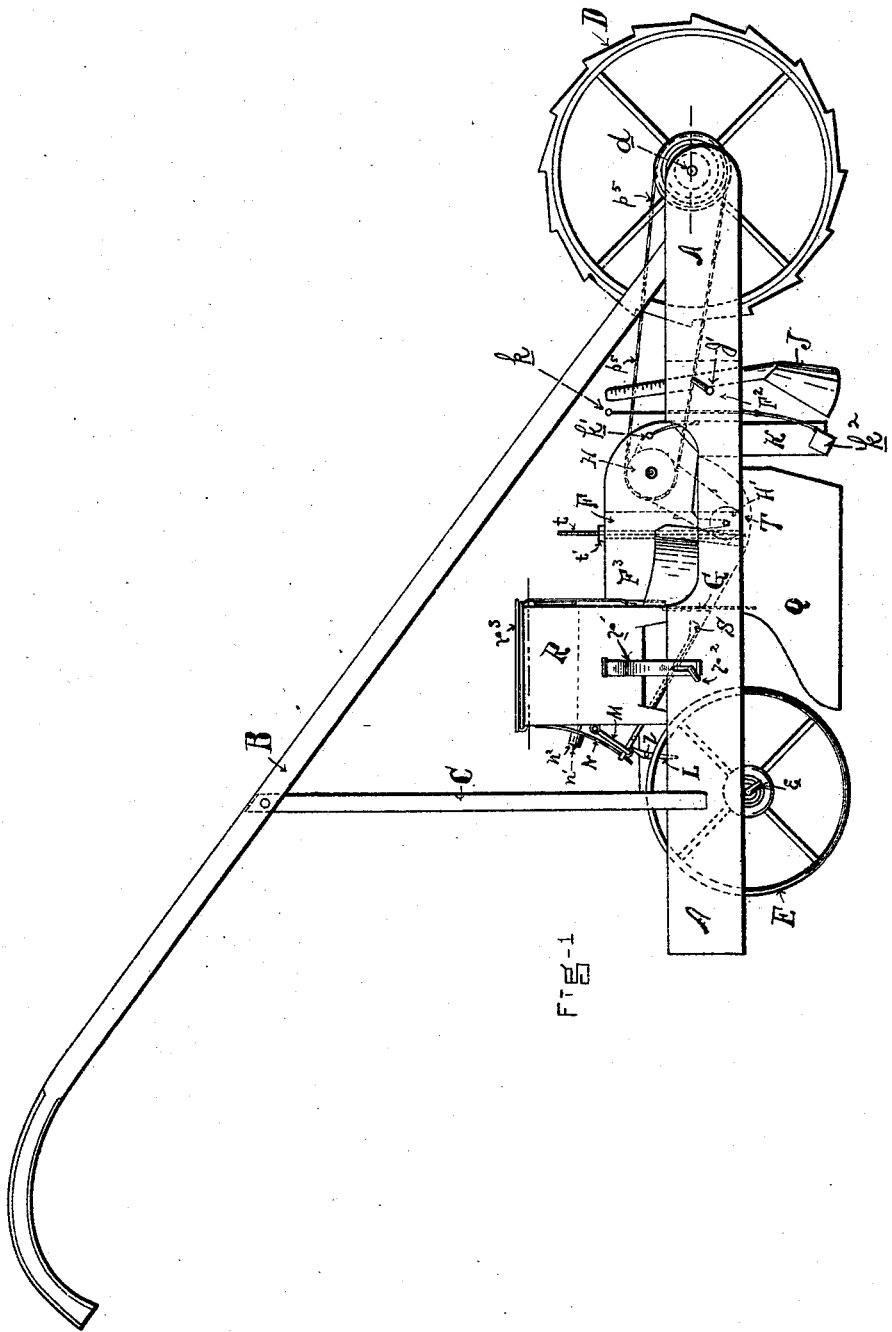
WITNESSES　　　　　　　　　　　　　　　INVENTOR

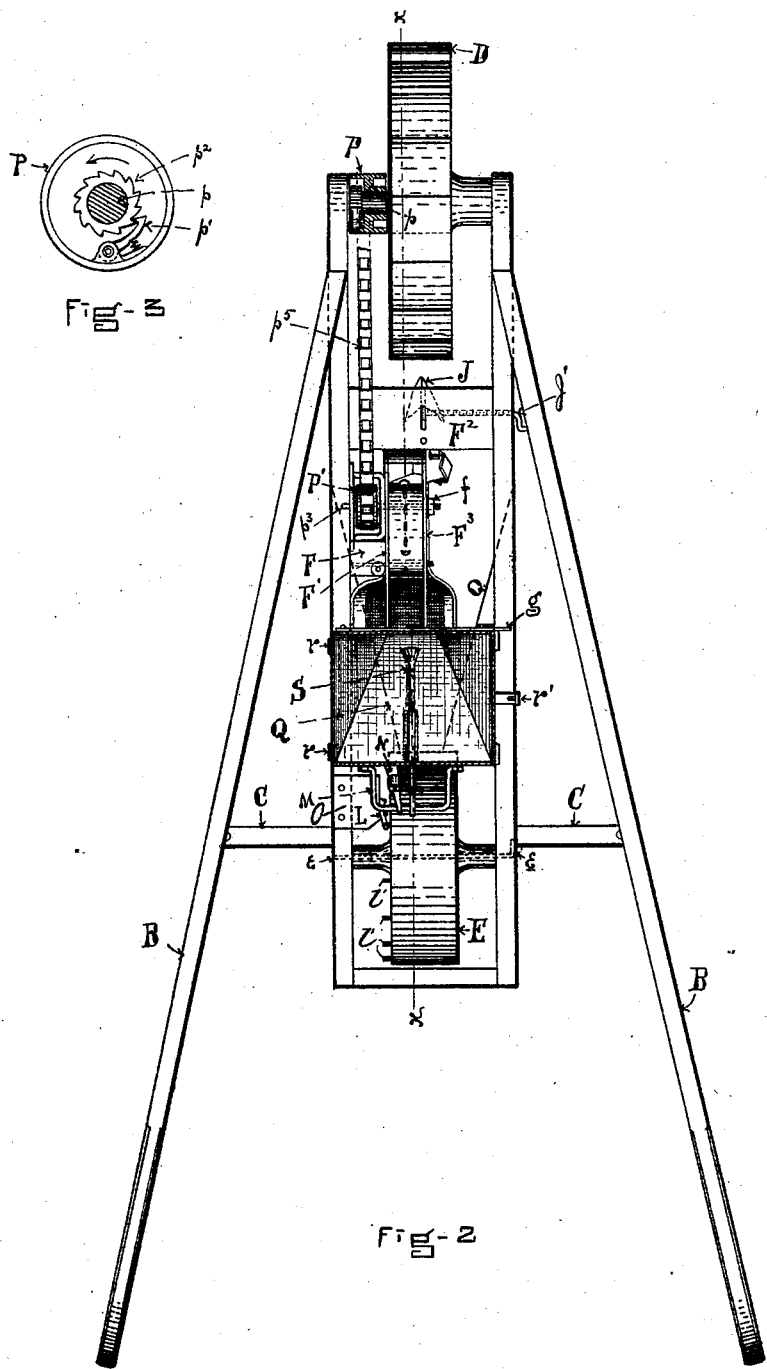

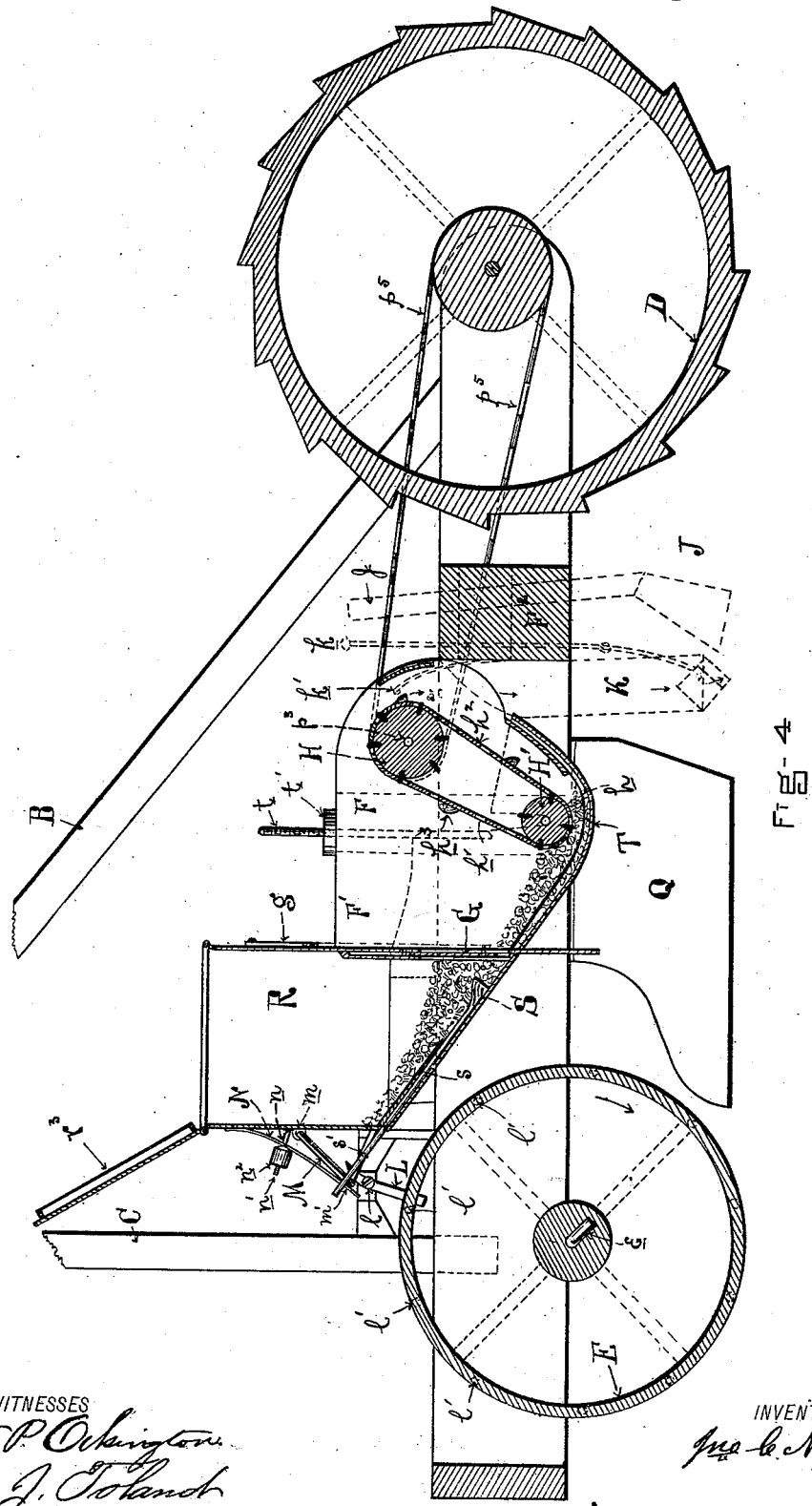

(No Model.)  J. C. NYE.  4 Sheets—Sheet 4.
SEED PLANTER.
No. 361,074.  Patented Apr. 12, 1887.
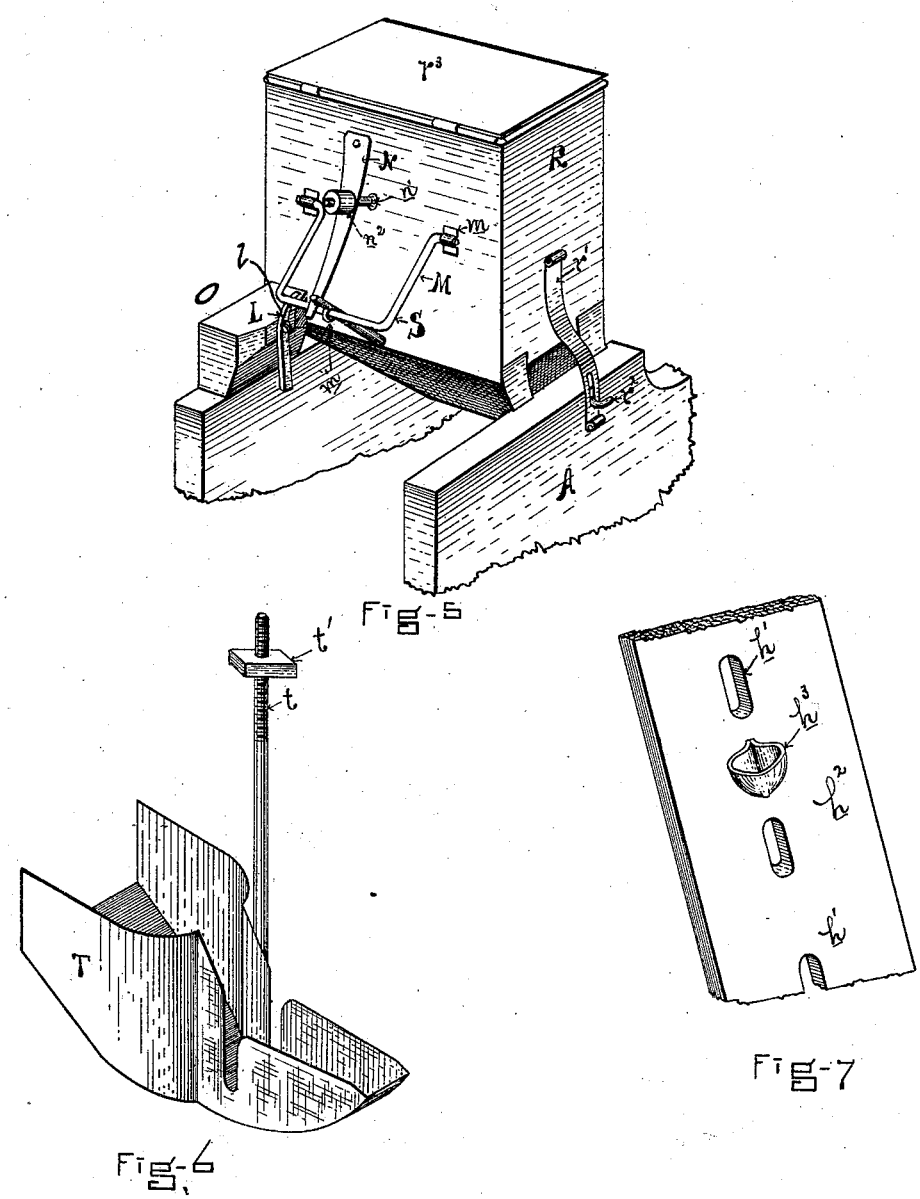

UNITED STATES PATENT OFFICE.

JOHN C. NYE, OF FALMOUTH, MASSACHUSETTS.

SEED-PLANTER.

SPECIFICATION forming part of Letters Patent No. 361,074, dated April 12, 1887.

Application filed January 21, 1887. Serial No. 224,977. (No model.)

*To all whom it may concern:*

Be it known that I, JOHN C. NYE, a citizen of the United States, residing at Falmouth, in the county of Barnstable and Commonwealth of Massachusetts, have invented a certain new and useful Improvement in Seed-Planters, of which the following is a specification, reference being had to the annexed drawings, forming a part of the said specification.

My invention relates to a machine for planting, which, being directed along the furrows of a plowed field, will deposit any desired quantity of the seed at regular intervals along the furrows; and it consists of combinations and devices hereinafter described and claimed.

Referring to the drawings, Figure 1 is a side elevation of my improved seed-planter. Fig. 2 is a plan view of the same. Fig. 3 is a side elevation and partial section of the pulley P, showing the pawl and ratchet. Fig. 4 is a vertical section of my improved planter along the line $x\ x$, Fig. 3. Fig. 5 is a rear view of the seed-reservoir, showing the ram and actuating mechanism. Fig. 6 is a perspective view of the adjustable seed-trough T. Fig. 7 is a view of a portion of the elevator-belt, showing the buckets, &c.

The machine is supported upon a frame, A A, and is guided by the curved handles B B, attached thereto, and strengthened by the braces C C. At the front end of the frame A is placed a wheel, D, revolving upon a pin, $d$, journaled in the side bars of the frame. The periphery of the wheel D is notched, to enable it to take a firm hold upon the ground. At the rear end of the frame A is placed a wheel, E, which is likewise supported and revolves upon a pin, $e$, journaled in the side bars of the frame. The rims of the wheels D and E are extremely broad, to prevent them from sinking into the soft earth of the plowed fields over which the machine is propelled. The entire weight of the machine rests upon these wheels. The pulley P revolves independently on a collar, $p$, of the wheel D, and is provided with a pawl, $p'$, Fig. 3, which engages with the teeth of a ratchet-wheel, $p^2$, which is revolved by the wheel D, whereby the wheel D and ratchet-wheel $p^2$ being revolved in the direction indicated by the arrow, Fig. 3, the pulley P will revolve with them, and the wheel D being revolved in the opposite direction, the pulley P will remain stationary.

The seed-reservoir R is supported upon the side bars of the frame A, and is held in place by the hinges $r\ r$ on one side and by the hinged clip $r'$ and staple $r^2$ on the other side. It is also provided with a hinged cover, $r^3$, and a gate, G, on its front side, which may be raised and lowered by the lever $g$, to regulate the flow of the seed into the seed-trough T. The bottom of the reservoir R is inclined downward from the back to the front, to facilitate the forward movement of the seed. The ram S slides in the sleeve $s$ along the inclined bottom of the reservoir R, and serves to continually push the seed toward the gate G. It extends backward through an opening in the back of the reservoir R, as shown in Fig. 4, and has a hinge at the point $s'$. The swinging staple M is hinged to the back of the reservoir R at $m\ m$, and passes through a ring-eye attached to the ram S. The spring N is attached to the back of the reservoir R, and acts against the swinging staple M to force it forward. It is pierced at $n$ by the pin $n'$, upon which is threaded the nut $n^2$. By screwing the nut $n^2$ down or up the strength of the spring may be increased or diminished.

The block O is attached to one of the side bars of the frame A, and supports the dog L, which swings upon the pin $l$. The upper end of the dog L engages with the swinging staple M, and its long end is adapted to engage with a series of pins, $l'\ l'\ l'$, placed on the circumference of the wheel E, whereby, the wheel E being caused to revolve, as indicated by the arrow, each of the pins $l'\ l'\ l'$ will in turn engage the long end of the dog L and move it forward, thereby drawing the swinging staple M and ram S backward until the pin $l'$ slips off from the end of the dog L, when the ram S will be driven forward by the spring N. The standard F is bolted to one of the side bars of the frame A, and is bored to receive the rod $t$, which supports the seed-trough T. By means of the nut $t'$, threaded onto the rod $t$, the seed-trough T may be raised and lowered. The standard F also supports the partition-plate F'. The pulley P' is supported by the shaft $p^3$, which revolves with it, and is journaled in the frame $p^4$ screwed to the side bar, A.

The pulleys P and P′ are provided with sprockets, which engage with the links of the sprocket-chain $p^5$, by which the pulley P′ is driven. The shaft $p^3$ extends through the partition F′, and carries the drum H, which revolves with it. The drum H′ revolves upon the pin $h$. The drums H and H′ are provided with sprocket-pins, which engage with slots $h'$ in the elevator-belt $h^2$. (Shown in detail in Fig. 7.) The buckets $h^3$ are made preferably of metal, and are each intended to hold the seed to be planted in one hill.

The block $F^2$ is fastened between the side bars of the frame A and supports the arm $j$ of the plow J and the rod $k$. The chute K is attached to the back of the block $F^2$, and may be raised or lowered by the arm $k'$. The hood or scatterer $k^2$ is hinged to the lower end of the chute K, and serves to disperse the seed. Its direction may be changed by raising or lowering the rod $k$. The inclined plates Q serve to cover the seed with earth as soon as deposited. The partition-plate $F^3$ is held in place by the nut $f$.

Separate elevator-belts with different sized and spaced buckets are provided for each kind of seed, according to its size, the number of seeds to a hill, and the distance between the hills.

The operation of the machine is as follows: The reservoir being partly filled with seed, the gate is raised and the seed descends into the seed-trough, as shown in Fig. 4. The machine is now propelled along the furrow to be planted, and the ground is opened by the plow J. The buckets $h^3$ on the elevator-belt fill themselves with seed, and discharge the required amount of seed at regular intervals into the delivery-chute K, and thence to the ground. The seed is then covered by the inclined plates Q Q. The vibrating ram S continually forces the seed in the reservoir toward the trough T. The plow J may be raised or lowered by loosening the screw J′. By turning the nut $t'$ up or down the seed-trough T may be adjusted in height according to the size of the seeds and the size of the buckets $h^3$, to assist the buckets in dipping up the seed. By removing the nuts $t'$ and $f$ the trough T and plate $F^3$ may be detached from the machine, and so allow free access to the machinery.

Should the wheel D be revolved backward, as is often necessary in turning corners, &c., the pawl-and-ratchet clutch $p'$ $p^2$ fails to act, and the drums H and H′ and the elevator-belt $h^2$ remain stationary.

What I claim as new and of my invention is—

1. In a seed-planter adapted to move upon wheels, in combination, a notched driving-wheel, an endless belt traveling upon drums and provided with buckets, an adjustable seed-trough into which said buckets dip, and mechanism whereby said drums are caused to revolve by the forward motion of the machine upon said driving-wheel, substantially as set forth.

2. In combination, the seed-holding reservoir R, the ram S, the swinging staple M, the spring N, the dog L, and the series of pins $l'$ $l'$ $l'$, all operating substantially as and for the purposes described.

3. In a seed-planter, a chute having hinged at its lower extremity an adjustable hood, $k^2$, adapted to be raised and lowered and its direction thereby changed, whereby the seed descending through the chute is dispersed upon leaving the chute, substantially as described.

4. In a seed-planter, in combination, the reservoir R, the ram S, vibrating within it, the seed-trough T, the endless-belt elevator $h^2$, and the delivery-chute K, all operating substantially as and for the purposes described.

5. In combination, the driving-wheel D, the pulley P, the ratchet $p^2$, the pawl $p'$, the driving-belt $p^5$, the pulley P′ driven thereby, the drums H and H′, the elevator-belt $h^2$, provided with buckets $h^3$, the adjustable concave seed-trough T, into which said buckets dip, adapted to be raised and lowered and its distance from the path of the buckets thereby adjusted, and the delivery-chute K, all substantially as and for the purposes described.

JNO. C. NYE.

Witnesses:
N. P. OCKINGTON,
DAVID HALL RICE.